(12) United States Patent
Niwa

(10) Patent No.: US 8,710,797 B2
(45) Date of Patent: Apr. 29, 2014

(54) DRIVING SUPPORT DEVICE, METHOD, AND PROGRAM

(75) Inventor: Toshiaki Niwa, Anjo-shi (JP)

(73) Assignee: Aisin AW Co., Ltd., Aich-Ken (JP)

( * ) Notice: Subject to any disclaimer, the term of this patent is extended or adjusted under 35 U.S.C. 154(b) by 615 days.

(21) Appl. No.: 12/971,619

(22) Filed: Dec. 17, 2010

(65) Prior Publication Data
US 2011/0227532 A1 Sep. 22, 2011

(30) Foreign Application Priority Data
Mar. 19, 2010 (JP) .................................. 2010-064127

(51) Int. Cl.
*H02J 7/00* (2006.01)

(52) U.S. Cl.
USPC .............. 320/109; 320/104; 320/134; 701/26

(58) Field of Classification Search
USPC ........... 320/104, 109, 134, 162; 701/26, 29.1, 701/32.5
See application file for complete search history.

(56) References Cited

U.S. PATENT DOCUMENTS

| 6,864,807 | B2 | 3/2005 | Todoriki et al. | |
|---|---|---|---|---|
| 8,301,365 | B2 * | 10/2012 | Niwa et al. | 701/532 |
| 2010/0094496 | A1 * | 4/2010 | Hershkovitz et al. | 701/22 |
| 2010/0138098 | A1 * | 6/2010 | Takahara et al. | 701/29 |

FOREIGN PATENT DOCUMENTS

| JP | 9-210702 A | 8/1997 |
|---|---|---|
| JP | 10-170293 A | 6/1998 |
| JP | 2000-163689 A | 6/2000 |
| JP | 2003-21522 A | 1/2003 |
| JP | 2006-112932 A | 4/2006 |
| JP | 2009-089756 A | 4/2009 |
| JP | 2010-32459 A | 2/2010 |
| WO | WO 2009013980 A1 * | 1/2009 |

OTHER PUBLICATIONS

Japanese Office Action issued in corresponding Japanese Application No. 2010-064127 dated Jul. 3, 2012.

* cited by examiner

*Primary Examiner* — Arun Williams
*Assistant Examiner* — Aaron Piggush
(74) *Attorney, Agent, or Firm* — Sughrue Mion, PLLC

(57) ABSTRACT

Provided is a driving support device and method that includes a charging facility information acquisition unit that acquires information indicating a position and a charging capacity of a charging facility that exists within a predetermined distance from a position of a vehicle and a guidance unit that provides information indicating a charging time period at the charging facility based on the position of the vehicle, a registered position, the position and the charging capacity of the charging facility, and a remaining electric power amount of a battery in the vehicle and information indicating a charging time period at the charging facility that is required for traveling a route from the position of the vehicle to the registered position by electric power of the battery.

6 Claims, 5 Drawing Sheets

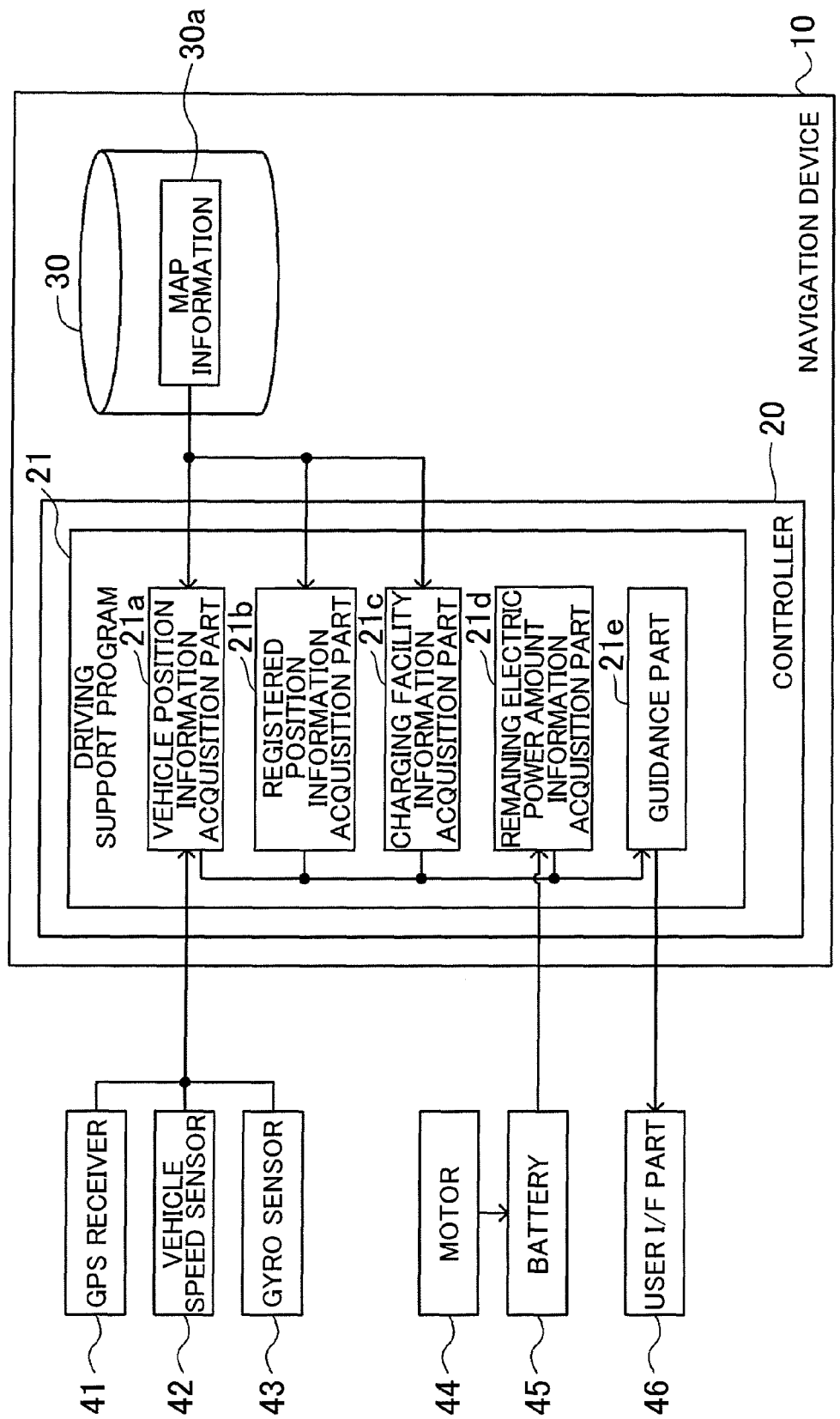

DRIVING SUPPORT DEVICE, METHOD, AND PROGRAM

INCORPORATION BY REFERENCE

This application claims priority from Japanese Patent Application No. 2010-064127 filed on Mar. 19, 2010, including the specification, drawings and abstract thereof, the disclosure of which is incorporated herein by reference in its entirety.

BACKGROUND OF THE INVENTION

1. Field of the Invention

Aspects of the present invention relate to a driving support device, a method, and a program in a vehicle that travels using electric power from a battery.

2. Description of the Related Art

In the related are, a technology that prevents using up the electric power of the battery in the vehicle traveling by the electric power of the battery, is known. For example, Japanese Patent Application; Publication No. JP-A-2009-89756 discloses a technology that recommends charging a battery if the remaining electric power of the battery drops below a first percentage of the electric power amount required to return home, and starts navigation processing for going home if the remaining electric power amount of the battery has become a second percentage or less.

SUMMARY OF THE INVENTION

In this related art technology, while the recommendation to charge is given, a method for charging the battery before reaching a registered position such as the home is not specified. Consequently, even when a charging facility where charging may be possible before reaching the registered position such as the home exists, it is not possible to perform the charging at the charging facility unless a driver is aware of the position of the charging facility. Thus, it is not possible in practice to perform the charging at a place other than the home even when the recommendation to charge the battery is given. Therefore, in order to continue to drive without feeling anxious about running-out of battery power, the driver has to go to the registered position directly after the advice for charging has been given.

In addition, it is unusual that the driver drives a vehicle without having any time constraints. In other words, the driver normally drives the vehicle with the intent of meeting a time constraint, such as an arrival time. In recent years, plans are underway to provide multiple charging facilities. Also, the charging amount that can be accomplished during a certain time period may vary largely depending on which of the charging facilities are used. Therefore, it is possible that the driver can reach the registered position within his or her time constraint if the charging is performed at an appropriate charging facility while not if the charging is performed at a charging facility where a long time period is required for charging.

In light of the problems described above, it is an aspect of the present invention to provide information with which the driver judges whether or not the charging at a charging facility is necessary for reaching the registered position, and if the charging is necessary, the driver judges whether or not it is possible to reach the registered position within his or her time constraint.

To achieve the aforementioned aspect, information indicating a charging time period at the charging facility that is required for traveling a route from a position of the vehicle to the registered position by electric power of the battery is provided. That is, by indicating the charging time period, whether or not the charging is necessary for traveling the route from the position of the vehicle to the registered position by the electric power of the battery, and if the charging is necessary, a time period that is required for charging at the charging facility, are informed to the driver. Consequently, the driver can judge the necessity of the charging based on the charging time period. In addition, if the charging is necessary, the driver can judge whether or not it is possible to reach the registered position within his or her time constraint.

A vehicle position information acquisition unit is not limited provided that it can acquire the position of the vehicle that will be a start point of the route to the registered position. Consequently, the position of the vehicle may be a current position of the vehicle, or a position that may be reached at a later time. A registered position information acquisition unit is not limited provided that it can acquire the registered position that has been previously registered as an end point of the route having the position of the route as the start point. Consequently, the registered position may be a destination that has been previously set, or a position of the home or the like that has been previously set as a position that may be the end point of the route.

A charging facility information acquisition unit is not limited provided that it can acquire information indicating a position and a charging capacity of the charging facility that exists within a predetermined distance from the position of the vehicle. That is, it is only necessary to acquire information indicating the position of the charging facility as a candidate to be used by the driver in the vicinity of the position of the vehicle. In addition, in order to determine the charging time period that is required at the charging facility, it is only necessary to acquire information indicating the charging capacity such as charging amount per a unit time period.

A remaining electric power amount information acquisition unit is not limited provided that it can acquire information indicating the remaining electric power amount of a battery at the above-mentioned position of the vehicle. That is, it is only necessary to acquire information (SOC and the like) indicating a usable electric power amount when the vehicle exists at the above-mentioned position of the vehicle. Consequently, if the position of the vehicle is the current position of the vehicle, information indicating the current remaining electric power amount of the battery is acquired. If the position of the vehicle is a position that may be reached at a time point after the present, the remaining electric power amount of the battery at the above-mentioned position of the vehicle is a value given by subtracting an electric power amount that would be consumed when the vehicle has traveled to the position that may be reached at a time point after the present from the current remaining electric power amount of the battery.

A guidance unit is not limited provided that it can determine the charging time period at the charging facility based on the position of the vehicle, the registered position, the position and the charging capacity of the charging facility, and the remaining electric power amount of the battery at the above-mentioned position of the vehicle, the charging time period being required for traveling the route from the position of the vehicle to the registered position by the electric power of the battery, and provide information indicating the charging time period. Various routes can be assumed as the route from the position of the vehicle to the registered position. For example, a route with a shortest distance that goes directly from the position of the vehicle to the registered position and a route passing through the charging facility or other facilities can be assumed.

In a certain route, if the electric power amount to travel from the position of the vehicle to the registered position is less than or equal to the remaining electric power amount of the battery at the above-mentioned position of the vehicle, the charging time period is zero because the charging at the charging facility is not necessary. In another route, if the electric power amount to travel from the position of the vehicle to the registered position is more than the remaining electric power amount of the battery at the above-mentioned position of the vehicle, the charging at the charging facility is necessary. In this case, a route that goes from the position of the vehicle to the charging facility, and then from the charging facility to the registered position is determined, and the electric power amount necessary for traveling such route is determined. Then, the necessary charging electric power amount is determined by comparing the electric power amount necessary for traveling such route with the remaining electric power amount of the battery at the above-mentioned position of the vehicle, and the charging time period for charging the battery for the necessary charging electric power amount is determined based on the charging capacity.

The charging time period may be directly or indirectly informed. That is, the charging time period may be directly indicated. Or, a symbol or a sound that allows the driver to recognize the charging time period may be given.

In addition, as an example of a configuration to indirectly inform the charging time period, a configuration to classify the charging time period into a plurality of stages and indicate the corresponding stage may be applied. For example, it is applicable to provide information on states in which the charging time period is zero, more than zero but less than or equal to a predetermined time period, and more than a predetermined time period, as different stages. According to this configuration, it is possible to inform the driver of the length of the charging time period in a simple and easily-understandable manner.

Obviously, the stage may be subdivided. For example, a state in which a difference given by subtracting the electric power amount necessary for traveling from the position of the vehicle to the registered position from the remaining electric power amount of the battery at the above-mentioned position of the vehicle is equal to or more than a predetermined percentage of the necessary electric power amount (for example, the difference is equal to or more than 10%) and a state in which the difference is less than the predetermined percentage (for example, the difference is between 0% to 10%) may be classified as different stages. According to this configuration, it is possible to explicitly indicate to the driver that the state in which the charging time period is zero transits to the state in which the charging time period is more than zero in the near future if the driver continues to drive.

The predetermined time period is not limited provided that it is set as a time period that increases options for route selection through comparison to the time constraint of the driver. Various time periods can be applied. For example, the predetermined time period may be a time period that many drivers deem acceptable as the charging time period at the charging facility (for example, 30 minutes). Or, the predetermined time period may be a time period that a rapid charging facility, where rapid charging is available, takes for charging the battery such that the remaining electric power amount of the battery becomes equal to or more than the predetermined percentage, or may be a predetermined percentage of a time period that is required when the vehicle travels directly from the position of the vehicle to the registered position. Further, the predetermined time period may be configurable by the driver, or may be an average sojourn time at a facility attached to the charging facility.

Further, the information on the state in which the charging time period is less than or equal to the predetermined time period may be provided together with information indicating the position of the charging facility. This information enables the driver to easily determine the charging facility necessary for traveling without using up the electric power of the battery.

Further, the configuration to determine the charging time period for each of a plurality of routes and provide the information on the plurality of routes being associated with the charging time periods may be applied. According to this configuration, it is possible to explicitly indicate the charging time periods that are required when the respective routes are traveled, whereby it is possible to provide the information such that the driver can select a route with a preferable charging time period. In addition, the information on the positions of the charging facilities to be passed on the respective routes may be provided if this configuration is applied.

Any routes can be applied as the route from the position of the vehicle to the registered position. However, a route going through the charging facility that exists in an opposite direction of the registered position with respect to the position of the vehicle may be provided. According to this configuration, it is possible to provide information indicating the charging time period that is required when the vehicle further travels ahead of the position of the vehicle instead of traveling directly from the position of the vehicle to the registered position, thereby increasing options for route selection. In addition, the charging facility that exists in the opposite direction of the registered position with respect to the position of the vehicle may be for example a charging facility that exists in an area where the registered position does not exist of areas given by dividing by a straight line that is perpendicular to a straight line connecting the position of the vehicle and the registered position and passes the position of the vehicle.

A relative positional relation among the position of the vehicle, the registered position, and the charging facility may be explicitly indicated together with the charging time period. For example, in case of the same charging time period, it may be explicitly indicated to the driver whether the charging facility, with which the registered position can be reached through charging for the charging time period, exists in the same direction as the registered position with respect to the position of the vehicle or in the opposite direction of the registered position with respect to the position of the vehicle. According to this configuration, the driver can easily recognize whether or not the vehicle can travel further ahead of the position of the vehicle and a travel direction in which the vehicle can continue to travel.

Various configurations to acquire the charging time period can be applied. For example, a configuration to acquire the total electric power amount necessary for traveling the route from the position of the vehicle to the registered position based on a distance of the route and the consumption electric power amount per a unit of distance of the battery, acquire the necessary electric power amount to charge the battery based on the total electric power amount and the remaining electric power amount of the battery at the above-mentioned position of the vehicle, and acquire the charging time period to be required for charging the battery for the necessary electric power amount based on the charging capacity may be applied. That is, if the distance of the route going through the charging facility is determined, the total electric power amount necessary for traveling the route can be acquired based on the consumption electric power amount per a unit of distance. If it is assumed that the total electric power amount is obtained by adding electric power into the remaining electric power amount of the battery at the above-mentioned position of the vehicle through charging, it is possible to acquire the charging time period that is required for such charging based on the charging capacity of the charging facility. The total electric power amount necessary for traveling the route from the position of the vehicle to the registered position may be acquired in consideration of other elements in addition to the distance. For example a configuration to determine the total electric power amount based on various kinds of information such as the inclination and the shape of curve sections of roads making up the route, an expected number of stops, the weather, and the like may be applied.

Further, a technique for providing information indicating the charging time period at the charging facility that is required for traveling the route from the position of the vehicle to the registered position by electric power of the battery, can also be applied in the forms of a program and a method. In addition, the device, the method, and the program described above may be implemented in a stand-alone device, and it may be implemented through parts used in common with respective components provided in the vehicle. For example, it is possible to provide a navigation device that is equipped with the device described above, and to provide the method and the program as well. These aspects of the present invention can also be modified as desired, such as by providing a portion of it in the form of software and a portion of it in the form of hardware, for example. These aspects of the present invention may also be practiced in the form of a storage medium for a program that controls the device. The software storage medium may be a magnetic storage medium or a magneto optical storage medium. Furthermore, any storage medium that is developed henceforth can also be considered to be exactly the same.

BRIEF DESCRIPTION OF THE DRAWINGS

FIG. 1 shows a block diagram of a navigation device including a driving support device.

DETAILED DESCRIPTION OF THE EXEMPLARY EMBODIMENTS

Figure 2A:
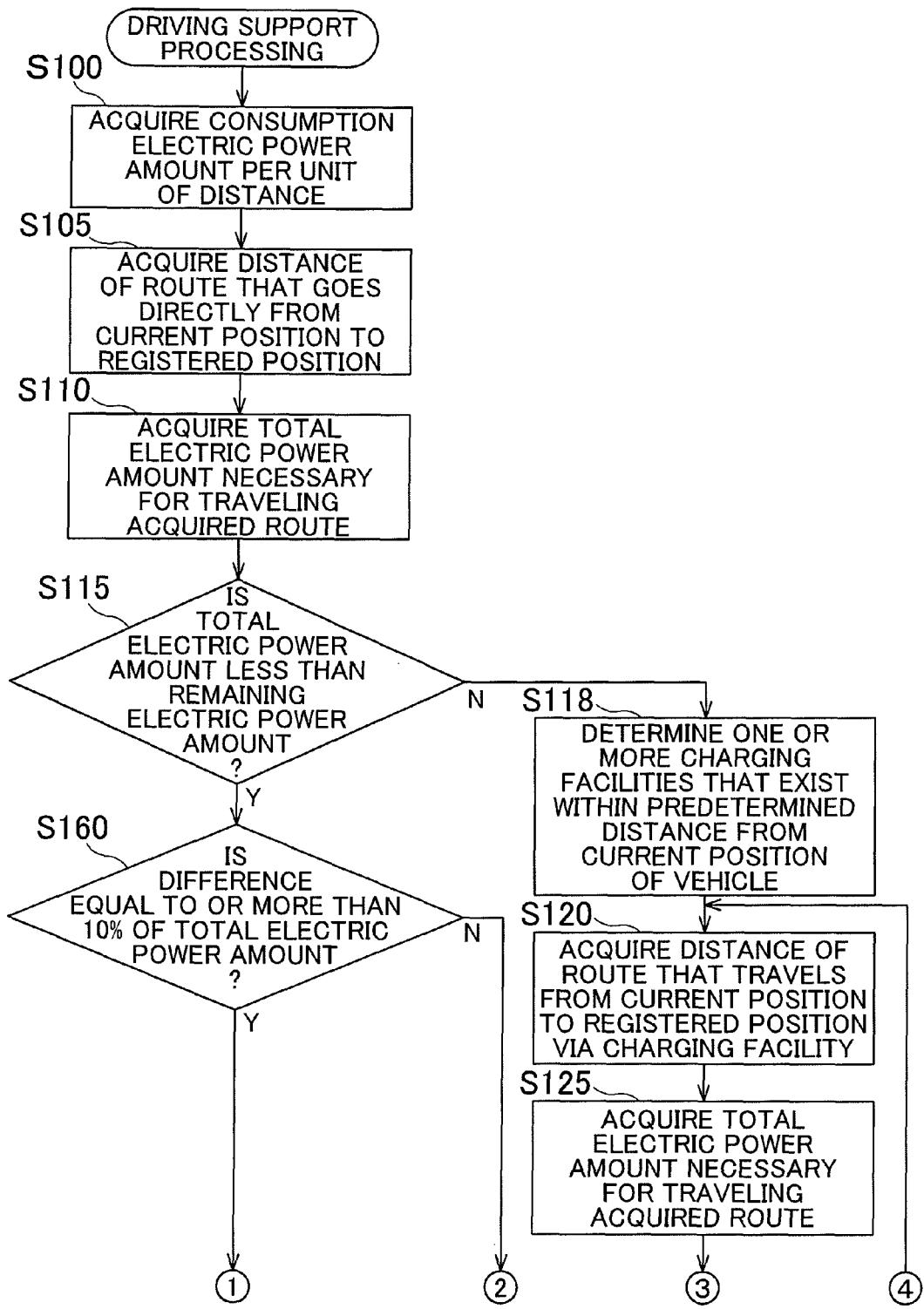
FIG. 2 is a flow chart showing driving support processing.

The aspects of the present invention are described in further detail below with reference to embodiments in the following order.

(1) Structure of navigation device:
(2) Driving support processing:
(3) Other embodiments:

(1) Structure of Navigation Device

FIG. 1 is a block diagram showing a structure of a navigation device 10 including a driving support device according to an exemplary embodiment of the present invention. The navigation device 10 includes a controller 20 and a storage medium 30. The controller 20 includes a CPU, a RAM, a ROM, and the like. Programs stored in the storage medium 30 and the ROM can be executed in the controller 20. In the present embodiment, a driving support program 21 can be executed as such program. The driving support program 21 includes a function that provides information indicating a charging time period at a charging facility that is required for traveling a route from a current position to a registered position. The driving support program 21 is executed together with a navigation program (not shown).

The storage medium 30 previously stores map information 30a. The map information 30a is information used for route searching, the determination of a position of a vehicle, and the determination of a position and a charging capacity of a charging facility, and includes node data indicating a node set on a road to be traveled by the vehicle, shape interpolating point data for determining a shape of the road between nodes, link data indicating a connection of nodes, data indicating a position of a feature existing on the road or in the vicinity of the road, and the like. In the present embodiment, a charging facility is included as a kind of the feature. Data indicating the feature as the charging facility is associated with information indicating the position and the charging capacity (electric power amount chargeable per unit time period) of the charging facility. Further, in the present embodiment, data indicating a position that a driver desires such as a home, a position of a frequently-visited facility, or the like can be registered as a part of the map information 30a. Here, the position that was registered is called as a registered position.

A vehicle provided with the navigation device 10 in the present embodiment includes a GPS receiver 41, a vehicle speed sensor 42, a gyro sensor 43, a motor 44, a battery 45, and a user interface ("I/F") part 46. The GPS receiver 41 receives radio waves from a GPS satellite and outputs information for calculating a current position of the vehicle via an interface (not shown). The controller 20 acquires the signal to determine the current position of the vehicle. The vehicle speed sensor 42 outputs the signal corresponding to a rotating speed of a wheel provided in the vehicle. The controller 20 acquires the signal via the interface (not shown) to determine a current speed of the vehicle. The gyro sensor 43 outputs the signal corresponding to an angular speed operated on the vehicle. The controller 20 acquires the signal via the interface (not shown) to determine a travel direction of the vehicle. The vehicle speed sensor 42, the gyro sensor 43, and the like are utilized to adjust the current position of the vehicle that is determined by the output signal of the GPS receiver 41. In addition, the current position of the vehicle is adjusted based on a travel track of the vehicle as appropriate.

The vehicle according to the present embodiment is an electric vehicle provided with the motor 44 that has the battery 45 as a power source. The motor 44 connected to a power transmission mechanism (not shown) moves the vehicle forward or backward by converting rotary drive force into propulsive force of the vehicle using the power transmission mechanism. The motor 44 is controlled by a drive control ECU (not shown). The drive control ECU can output a control signal toward the motor 44 according to an operation on a throttle pedal (not shown). The drive control ECU outputs the control signal toward the motor 44 and controls such that the motor 44 generates the rotary drive force.

The battery 45 in the present embodiment is connected to the controller 20 via the interface (not shown). When the controller 20 outputs the control signal, the battery 45 outputs information indicating a remaining electric power amount according to the control signal. The controller 20 determines the remaining electric power amount of the battery 45 based on the information indicating the remaining electric power amount.

The user I/F part 46 is an interface part to input an instruction of the driver and provide the driver with various kinds of information. The user I/F part 46 includes a touch panel display, a switch, a speaker (not shown), and the like.

As mentioned above, the vehicle according to the present embodiment is the electric vehicle that has the battery 45 as the power source, and is capable of extending a distance and a time period that the vehicle can travel by charging the battery 45 at the charging facility. In the present embodiment, the information that enables the driver to select a route according to a time constraint of the driver is provided by processing of the driving support program 21.

To execute this processing, the driving support program 21 includes a vehicle position information acquisition part 21a, a registered position information acquisition part 21b, a charging facility information acquisition part 21c, a remaining electric power amount information acquisition part 21d, and a guidance part 21e. The vehicle position information acquisition part 21a is a module that causes the controller 20 to realize a function for acquiring information indicating the current position of the vehicle. That is, the controller 20 acquires the information indicating the current position of the vehicle based on output signals of the GPS receiver 41, the vehicle speed sensor 42, and the gyro sensor 43, and the map information 30a.

The registered position information acquisition part 21b is a module that causes the controller 20 to realize a function for acquiring information indicating the registered position. The controller 20 refers to the map information 30a to acquire the information indicating the above-mentioned registered position.

The charging facility information acquisition part 21c is a module that causes the controller 20 to realize a function for acquiring information indicating the position and the charging capacity of the charging facility (or facilities) that exists within a predetermined distance from the current position. That is, the controller 20 acquires information indicating the current position of the vehicle that was determined as mentioned above, refers to the map information 30a to determine the charging facility that exists within the predetermined distance from the current position, and acquires the information indicating the position and the charging capacity of the charging facility. The predetermined distance can be defined by a distance that can be traveled with the remaining electric power amount of the battery 45 or the like.

The remaining electric power amount information acquisition part 21d is a module that causes the controller 20 to realize a function for acquiring information indicating the remaining electric power amount of the battery 45. That is, the controller 20 outputs the control signal toward the battery 45, acquires information indicating the remaining electric power amount outputted from the battery 45 according to the control signal, and determines the current remaining electric power amount of the battery 45.

The guidance part 21e is a module that causes the controller 20 to realize a function for providing the information indicating the charging time period at the charging facility that is required for traveling the route from the current position to the registered position by electric power of the battery. That is, the controller 20 acquires the charging time period based on the current position, the registered position, the position and the charging capacity of the charging facility, and the remaining electric power amount of the battery. Specifically, the controller 20 acquires the total electric power amount necessary for traveling the route from the current position to the registered position based on a distance of the route and consumption electric power amount per a unit of distance of the battery. In addition, the controller 20 acquires necessary electric power amount to charge the battery based on the total electric power amount and the remaining electric power amount of the battery. Further, the controller 20 acquires the charging time period to be required for charging the battery for the necessary electric power amount based on the charging capacity of the charging facility. And, the controller 20 outputs the control signal toward the user I/F part 46 to display information indicating the charging time period. In the present embodiment, the controller 20 displays the current position of the vehicle on the user I/F part 46 such that the current position of the vehicle is associated with the charging time period.

According to the above configuration, the driver can always recognize the charging time period that is required for traveling from the current position of the vehicle to the registered position. That is, the driver can recognize that the charging time period is 0 or more than 0, which enables the driver to judge whether or not the charging is necessary for traveling the route from the current position to the registered position by the electric power of the battery. In addition, if the charging is necessary, the driver can judge whether or not the driver can reach the registered position within his or her time constraint.

(2) Driving Support Processing

Figure 2B:
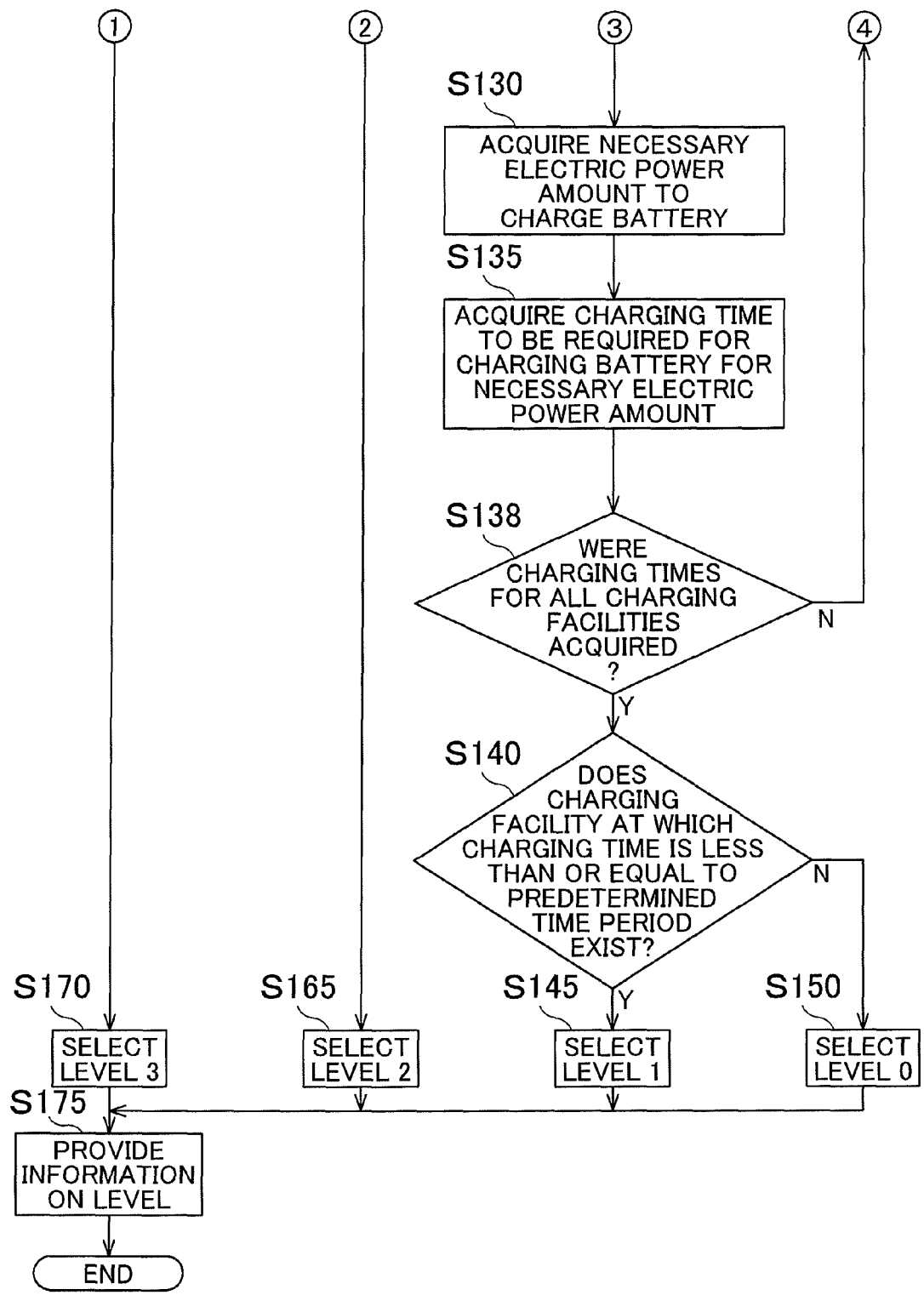

Next, driving support processing by the driving support program 21 is described. The driving support program 21 is executed at predetermined intervals (for example, at intervals of 100 ms). FIG. 2 is a flow chart showing the driving support processing that is executed by the driving support program 21. When the processing of the driving support program 21 starts, the controller 20 acquires the information indicating the consumption electric power amount per unit of distance of the battery 45 (Step S100). The information indicating the consumption electric power amount per unit of distance may be stored in the storage medium 30, or may be calculated and acquired from a consumption history of the consumption electric power amount of the battery 45 and a travel history of the vehicle.

Next, the controller 20, by the processing of the vehicle position information acquisition part 21a, the registered position information acquisition part 21b, and the guidance part 21e, acquires the distance of the route that goes directly from the current position to the registered position (Step S105). That is, the controller 20 acquires the information indicating the current position of the vehicle by the processing of the vehicle position information acquisition part 21a, and acquires the information indicating the registered position by the processing of the registered position information acquisition part 21b. And, the controller 20 refers to the map information 30a and searches for the route from the current position to the registered position based on costs associated with respective links by the known route search algorithm by the processing of the guidance part 21e. The controller 20 considers a route with the smallest cost among routes from the current position to the registered position as the route that goes directly from the current position to the registered position. Further, the controller 20 refers to the map information 30a to determine the distance of the route.

Next, the controller 20, by the processing of the guidance part 21e, acquires the total electric power amount necessary for traveling the route that was acquired at Step S105 (Step S110). That is, the controller 20 acquires the total electric power amount by multiplying the distance of the route that was acquired at Step S105 by the consumption electric power amount per unit of distance that was acquired at Step S100.

The controller 20, by the processing of the guidance part 21e, judges whether or not the total electric power amount necessary for traveling the route is less than the remaining electric power amount of the battery 45 (Step S115). That is, the controller 20 outputs the control signal toward the battery 45 to acquire the information indicating the remaining electric power amount outputted by the battery 45 and compares the total electric power amount that was acquired at Step S110 with the remaining electric power amount of the battery 45.

If it is not judged at Step S115 that the total electric power amount necessary for traveling the route is less than the remaining electric power amount of the battery 45, that is, if the remaining electric power amount of the battery 45 is short of the electric power amount for traveling directly from the current position to the registered position, the controller 20, by the processing of the charging facility information acquisition part 21c, refers to the map information 30a to determine the positions of one or more charging facilities that exist within the predetermined distance from the current position of the vehicle (Step S118). Next, the controller 20, by the processing of the guidance part 21e, acquires, toward one charging facility among the one or more charging facilities determined at Step S118, the distance of the route that travels from the current position to the registered position via the charging facility (Step S120).

Further, the controller 20, by the processing of the guidance part 21e, refers to the map information 30a and searches for the route that travels from the current position to the registered position via the charging facility. That is, the controller 20 searches for the route from the current position to the position of the charging facility that exists within the predetermined distance from the current position, whose cost becomes the smallest, by the known route search algorithm based on the costs associated with the respective links. Then, the controller 20 searches for the route from the position of the charging facility that exists within the predetermined distance from the current position to the registered position, whose cost becomes the smallest. The controller 20 connects the searched routes and sets the connected route as the route that travels from the current position to the registered position via the charging facility that exists within the predetermined distance. Further, the controller 20 refers to the map information 30a and determines the distance of the route.

Next, the controller 20, by the processing of the guidance part 21e, acquires the total electric power amount necessary for traveling the route that was acquired at Step S120 (Step S125). That is, the controller 20 acquires the total electric power amount by multiplying the distance of the route that was acquired at Step S120 by the consumption electric power amount per unit of distance that was acquired at Step S100.

The controller 20, by the processing of the guidance part 21e, acquires the necessary electric power amount to charge the battery at the charging facility that exists within the predetermined distance from the current position (Step S130). That is, the controller 20 acquires the necessary electric power amount by subtracting the remaining electric power amount of the battery 45 from the total electric power amount. Next, the controller 20, by the processing of the guidance part 21e, acquires the charging time period to be required for charging the battery for the necessary electric power amount (Step S135). That is, the controller 20 refers to the map information 30a, determines the charging capacity (the charging amount per unit of distance) of the charging facility that exists within the predetermined distance from the current position, and acquires the charging time period by dividing the necessary electric power amount by the charging amount per unit time period. Next, the controller 20 judges whether or not the processing to acquire the charging time period has been executed toward all of the one or more charging facilities that were determined at Step S118 (Step S138). If it is not judged at Step S138 that the processing to acquire the charging time period has been executed toward all charging facilities, the controller 20 sets a charging facility before processing as a processing target and repeats the processing at Step S120 and the subsequent steps.

On the other hand, if it has been judged at Step S138 that the processing to acquire the charging time period has been executed toward all charging facilities, the controller 20, by the processing of the guidance part 21e, judges whether or not the charging facility at which the charging time period is less than or equal to a predetermined time period exists (Step S140). That is, if the charging time period of at least one charging facility among the one or more charging facilities that were determined at Step S118 is less than or equal to the predetermined time period, the controller 20 judges that the charging facility at which the charging time period is less than or equal to the predetermined time period exists. On the other hand, if the charging time periods of all of the one or more charging facilities that were determined at Step S118 are more than the predetermined time period, or if no charging facility has been determined at Step S118, the controller 20 does not judge that the charging facility at which the charging time period is less than or equal to the predetermined time period exists.

Here, the predetermined time period is a time period that is set as a time period that increases options for route selection through comparison to the time constraint of the driver. In the present embodiment, the predetermined time period is a time period that many drivers deem acceptable as the charging time period at the charging facility (for example, 30 minutes). If it has been judged at Step S140 that the charging time period is less than or equal to the predetermined time period, the controller 20 sets a level indicating the charging time period to a level 1. If it is not judged at Step S140 that the charging time period is less than or equal to the predetermined time period, the controller 20 sets the level indicating the charging time period to a level 0. That is, in the present embodiment, the charging time period is classified into a plurality of stages, and the level 1 indicates a state in which the charging time period is more than zero but less than or equal to the predetermined time period. The level 0 indicates a state in which the charging time period is more than the predetermined time period.

If it has been judged at Step S115 that the total electric power amount necessary for traveling the route is less than the remaining electric power amount of the battery 45, that is, if it is possible to travel directly from the current position to the registered position with the remaining electric power amount of the battery 45, the controller 20, by the processing of the guidance part 21e, judges whether or not the difference given by subtracting the total electric power amount necessary for traveling the route from the remaining electric power amount of the battery 45 is equal to or more than 10% of the total electric power amount necessary for traveling the route (Step S160). That is, the controller 20 judges whether or not (the remaining electric power amount–the total electric power amount)/the total electric power amount is equal to or more than 0.1.

If it is not judged at Step S160 that the difference is equal to or more than 10% of the total electric power amount, the controller 20 selects a level 2 (Step S165). If it has been judged that the difference is equal to or more than 10% of the total electric power amount, the controller 20 selects a level 3 (Step S170). Both the level 2 and the level 3 correspond to the case in which the charging time period is zero (that is, the case in which it is possible to reach the registered position without charging if directly traveled). The case in which the charging time period is zero is classified into smaller levels. That is, in the present embodiment, the cases in which the remaining electric power amount of the battery 45 has a margin of 10% or more and a margin of less than 10% toward the total electric power amount necessary for traveling the route are set to different levels.

When a level is selected at any of Step S145, Step S150, Step S165, and Step S170, the controller 20, by the processing of the guidance part 21e, provides the driver with the information on the level at the current position of the vehicle (Step S175). In case of the level 1, the controller 20 provides the information on the level and the information indicating the route via the charging facility as the information indicating the position of the charging facility. That is, the controller 20 determines at Step S140 the charging facility that is closest to the current position of the vehicle from the charging facilities at which it was judged the charging time period is less than or equal to the predetermined time period. The controller 20 outputs the control signal toward the user I/F part 46 and displays the route to reach the registered position via the charging facility that is closest to the current position on the map displayed on the user I/F part 46. As a result, it is possible to inform the driver of the length of the charging time period in a simple and easy manner using the levels. Further, if the charging facility where the charging of the electric power for reaching the registered position is possible in the predetermined time period or less exists, it is possible to explicitly indicate the driver the route to reach the registered position via the charging facility.

Figure 3:
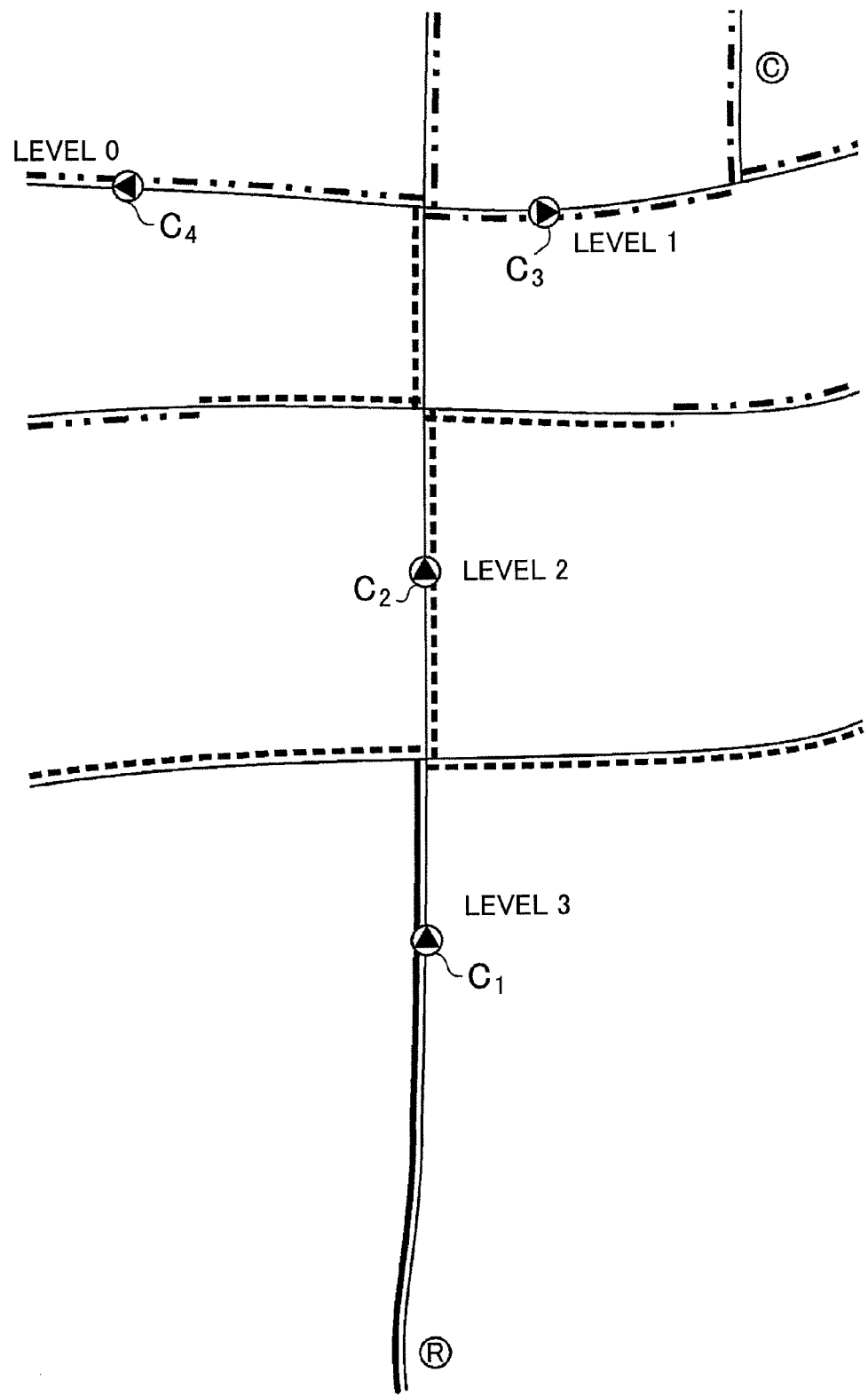
FIG. 3 shows examples of positions of a vehicle traveling along a road and examples of levels that are informed at the respective positions.

The above driving support processing is executed at predetermined intervals such as at intervals of 100 ms in the navigation device 10. Therefore, as the current position of the vehicle moves according to a driving operation of the driver, the level corresponding to the current position is sequentially displayed. FIG. 3 shows examples of the positions of the vehicle traveling along a road and examples of the levels to be informed at the respective positions. In FIG. 3, a thin line indicates a road, a mark of a triangle in a circle indicates the position of the vehicle, and the level when the vehicle travels at each of positions $C_1$ to $C_4$ is noted besides the mark. Further, in FIG. 3, a mark of a letter R in a circle indicates the registered position (hereinafter, referred to as a registered position R), and a mark of a letter C in a circle indicates the position of the charging facility (hereinafter, referred to as a charging facility C).

In this example, it is assumed that the driver started to drive in a state in which the remaining electric power amount of the battery 45 is equal to or more than a predetermined amount at the registered position R. From the registered position R, the vehicle travels upward of FIG. 3. While the vehicle is traveling in a section indicated by a thick line, the difference given by subtracting the total electric power amount necessary for traveling the route from the remaining electric power amount of the battery 45 is equal to or more than 10% of the total electric power amount necessary for traveling the route. Further, while the vehicle is traveling in a section indicated by a thick dashed line, the difference given by subtracting the total electric power amount necessary for traveling the route from the remaining electric power amount of the battery 45 is less than 10% of the total electric power amount necessary for traveling the route.

A thick dashed-dotted line indicates a section that is far from the registered position R compared to the section indicated by the thick dashed line and where the vehicle can reach the registered position R by charging for the predetermined time period or less at the charging facility C. Further, a thick dashed-two dotted line indicates a section that is far from the registered position R compared to the section indicated by the thick dashed line and does not have a charging facility within the predetermined distance at which the charging for the predetermined time period or less enables the vehicle to reach the registered position R.

In this example, if the driver starts to travel upward of FIG. 3 in a state in which the remaining electric power amount of the battery 45 is equal to or more than the predetermined amount at the registered position R, it continues to be informed that the current position of the vehicle is the level 3 in the course of traveling the section indicated by the thick line such as at the position $C_1$. When the vehicle moves to the section indicated by the thick dashed line, it is informed that the current position of the vehicle is the level 2. It continues to be informed that the current position of the vehicle is the level 2 in the course of traveling the section indicated by the thick dashed line such as at the position $C_2$. Therefore, it is possible to explicitly indicate that the state in which the charging time period is zero transits to the state in which the charging time period is more than zero in a near future if the driver continues to travel.

Further, when the vehicle moves from the section indicated by the thick dashed line to the section indicated by the thick dashed-dotted line, it is informed that the current position of the vehicle is the level 1. It continues to be informed that the current position of the vehicle is the level 1 in the course of traveling the section indicated by the thick dashed-dotted line such as at the position $C_3$. At the same time, the route to reach the registered position via the charging facility is also informed. In addition, when the vehicle moves from the section indicated by the thick dashed line to the section indicated by the thick dashed-two dotted line, it is informed that the current position of the vehicle is the level 0. It continues to be informed that the current position of the vehicle is the level 0 until the charging of the battery 45 is performed. As mentioned above, according to the present embodiment, the driver can always recognize whether or not the charging of the battery 45 is necessary in order to travel the route that directly goes to the registered position. When the remaining electric power amount of the battery 45 has become short of the electric power necessary for traveling the route that directly goes to the registered position, if it is possible to reach the registered position with the charging for the predetermined time period or less, the level indicating that the charging time period is less than or equal to the predetermined time period and the route to reach the registered position via the charging facility are informed. Consequently, if the charging of the battery 45 has become necessary, the route for performing the charging at the charging facility is informed to the driver instead of reaching the registered position without charging.

The driver drives knowing that the level transits from 3 to 1 via 2 or from 3 to 0 via 2 when continuing to drive. Therefore, the driver can judge, in the state in which the level 3 is being informed, whether or not to continue to drive until the level 2 is informed by consuming the remaining electric power amount of the battery 45. In addition, the driver can judge, in the state of the level 2, whether or not to continue to drive until the level 2 transits to the level 1 or the level 0 in which the charging at the charging facility is necessary by consuming the remaining electric power amount of the battery 45. That is, the driver can judge that the charging is not necessary to reach the registered position in case of the level 3 or level 2. In addition, the driver can judge that the registered position can be reached by charging for the predetermined time period or less at the charging facility in case of the level 1. Further, the driver can judge that the registered position can be reached by charging for more than the predetermined time period at the charging facility or that the charging facility where charging is possible does not exist in case of the level 0. Consequently, the driver can judge whether or not it is possible to reach the registered position within his or her time constraint.

(3) Other Embodiments

The above-mentioned embodiment is an example to realize the present invention. Other embodiments can be also applied provided that the information indicating the charging time period at the charging facility that is required for traveling the route from the position of the vehicle to the registered position by the electric power of the battery is provided. For example, the position of the vehicle may be a start point of the route to the registered position, and may be set to a position that may be reached at a time point after the present. In this case, the remaining electric power amount of the battery 45 at the above-mentioned position of the vehicle is a value given by subtracting the consumption electric power amount when the vehicle has traveled to the position that may be reached at a time point after the present from the current remaining electric power amount of the battery 45. The position that may be reached at a time point after the present may be inputted by the driver, or may be automatically selected from points within radius of a predetermined distance from the vehicle. In addition, the registered position is not limited provided that it is an end point of the route having the position of the vehicle as the start point and registered before the vehicle starts to travel. Consequently, the registered position may be a previously-set destination.

Further, the charging time period varies depending on the route and the position of the charging facility. Therefore, a plurality of routes may be assumed as the route from the position of the vehicle to the registered position and charging time periods for the plurality of routes may be informed. For example, the charging time period for each of a route with the shortest distance that travels directly from the position of the vehicle to the registered position and routes via the charging facility and other facilities may be informed. According to this configuration, it is possible to explicitly indicate the charging time periods that are required when the respective routes are traveled, whereby it is possible to provide information such that the driver can select a route with a preferable charging time period. In addition, information on the positions of the charging facilities to be passed on the respective routes may be provided.

Figure 4A:
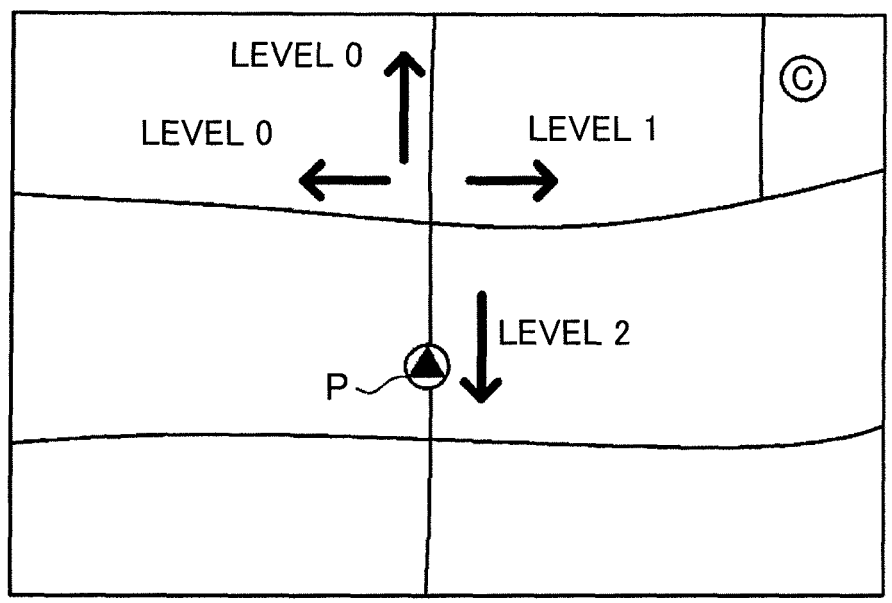
FIGS. 4A and 4B show examples of display on a user I/F part.

FIG. 4A shows an example of display on the user I/F 46 if the charging time period is informed toward each of the plurality of routes. In FIG. 4A, a thin line on the display shown by a rectangular frame indicates a road and a triangle in a circle indicates a position P of the vehicle on the road. In addition, a letter C in a circle indicates the charging facility. In the present example, the route if the vehicle travels directly from the current position to the registered position and the routes if the vehicle travels beyond an intersection ahead of the vehicle are indicated by arrows, and the level corresponding to the charging time period is indicated besides each arrow.

Consequently, the driver can recognize that it is possible to reach the registered position without charging if the driver travels backward in relation to the current position of the vehicle on the route that directly goes to the registered position. In addition, the driver can recognize that it is possible to reach the registered position by the charging for the predetermined time period or less if the driver makes a right turn at the intersection ahead of the current position of the vehicle and performs the charging at the charging facility C. Further, the driver can recognize that the charging facility at which the charging for the predetermined time period or less enables the vehicle to reach the registered position does not exist if the driver goes straight or makes a left turn at the intersection ahead of the current position of the vehicle. In such manner, in the present example, the level of the route if the vehicle travels directly from the current position of the vehicle to the registered position and the levels of the routes if the vehicle further travels ahead of the current position are indicated. Therefore, the driver can predict whether or not it is possible to reach the registered position within his or her time constraint and select a route. In the example indicated in FIG. 4A, if the vehicle does not make a right turn at the intersection ahead of the vehicle, the level becomes 0, that is, the route with the level 1 that is selectable at the intersection is only the route to make a right turn at the intersection. If only one route with level 1 exists, only the route with the level 1 may be informed.

Figure 4B:
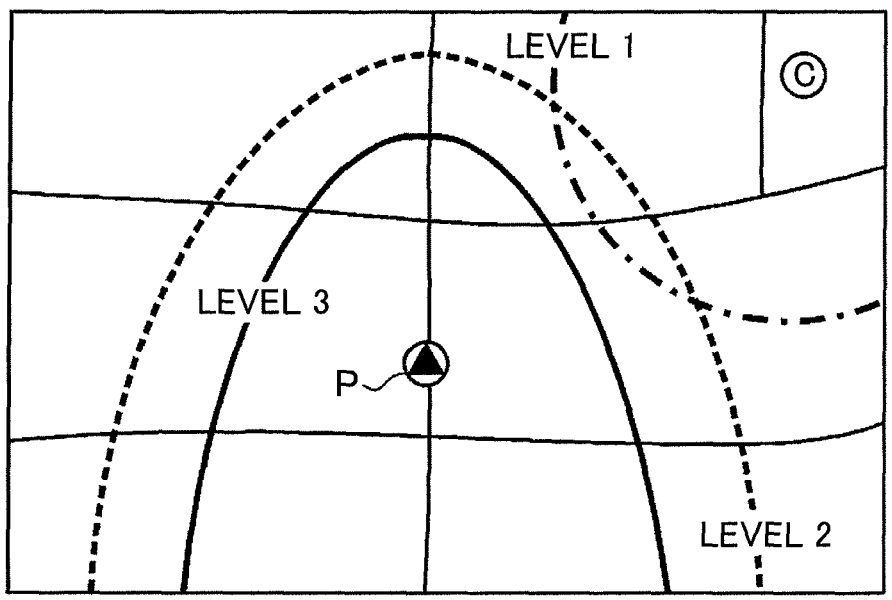

Various examples can be applied as configurations to inform the charging time periods for the routes if the vehicle further travels ahead of the current position. FIG. 4B shows an example of informing the levels corresponding to the charging time periods by displaying on the user IX part 46 an area where the charging is not necessary and an area where the registered position can be reached through the charging for the predetermined time period or less. In FIG. 4B, a thin line on the display shown by a rectangular frame indicates a road and a triangle in a circle indicates a position P of the vehicle on the road. In addition, a letter C in a circle indicates the charging facility.

In the present example, the thick line indicates an area where the difference given by subtracting the total electric power amount necessary for traveling the route from the remaining electric power amount of the battery 45 if the vehicle travels directly from the current position to the registered position is 10% or more of the total electric power amount necessary for traveling the route, and the level 3 is also indicated. The thick dashed line indicates an area where the difference given by subtracting the total electric power amount necessary for traveling the route from the remaining electric power amount of the battery 45 if the vehicle travels directly from the current position to the registered position is less than 10% of the total electric power amount necessary for traveling the route, and the level 2 is also indicated. Further, the dashed-dotted line indicates an area where the registered position can be reached through the charging for the predetermined time period or less at the charging facility C, and the level 1 is indicated. Other area corresponds to the level 0 indicating that the charging facility at which the charging for the predetermined time period or less enables the vehicle to reach the registered position does not exist. The display of the areas as above sequentially changes as the position of the vehicle changes. According to such information, the driver can recognize the area where the registered position can be reached without the charging and the area where the registered position can be reached by the charging for the predetermined time period or less, whereby the driver can predict whether or not it is possible to reach the registered position within his or her time constraint and select a route.

Further, besides the configuration to inform the charging time period in a phased manner, the charging time period may be informed using symbols, audio sounds, and the like, or may be directly informed.

Further, the predetermined time period is not limited provided that it can be set as a time period that increases options for route selection through comparison to the time constraint of the driver. For example, the predetermined time period may be a time period that the charging facility where rapid charging is available takes for charging the battery in order that the remaining electric power amount becomes equal to or more than the predetermined percentage, or may be a predetermined percentage of a time period that is required when the vehicle travels directly from the position of the vehicle to the registered position. Further, the predetermined time period may be configurable by the driver, or may be an average sojourn time at a facility attached to the charging facility.

Any routes can be applied as the route from the position of the vehicle to the registered position. A relative positional relation among the position of the vehicle, the registered position, and the charging facility may be explicitly indicated together with the charging time period. For example, in case of the same charging time period, it may be explicitly indicated to the driver whether the charging facility with which the registered position can be reached through the charging for the charging time period exists in the same direction as the registered position with respect to the position of the vehicle or in the opposite direction of the registered position with respect to the position of the vehicle. According to this configuration, the driver can easily recognize whether or not the vehicle can travel further ahead of the position of the vehicle.

The total electric power amount necessary for traveling the route from the position of the vehicle to the registered position may be acquired in consideration of other elements in addition to the distance. For example, a configuration to determine the total electric power amount based on various kinds of information such as the inclination and the shape of curve sections of roads consisting of the route, an expected number of stop, the weather, and the like may be applied.

Further, the vehicle according to the abovementioned embodiments is an electric vehicle. However, the present invention may be applied to a hybrid vehicle and a plug-in hybrid vehicle. That is, in the hybrid vehicle and the plug-in hybrid vehicle, the charging time period if the vehicle continues to travel only with a battery may be informed together with the route.

Further, a travel time to travel the route may be informed together with the charging time period. According to this configuration, the driver can easily judge whether or not it is possible to reach the registered position within his or her time constraint.

Further, the charging time period at the charging facility may be a sum of a time period spent for charging and a waiting time. For example, a reservation status and a usage status of the charging facility are acquired by communication, the waiting time according to the reservation status and the usage status is acquired, the sum of the waiting time and the charging time period acquired based on the charging capacity in the above-mentioned embodiment is acquired, and the sum is considered as the charging time period at the charging facility.

Further, the case in which the registered position cannot be reached by the charging for the predetermined time period or less may be classified in more detail and informed. For example, the case in which the registered position can be reached by the charging for a time period more than the predetermined time period and the case in which the charging facility where charging is possible does not exist are informed as different stages.

Further, the information indicating the charging time period can be determined for each charging facility. Therefore, the charging time period at each charging facility may be associated with the position of the vehicle, and the charging time periods for a plurality of charging facilities may be informed.

While various features have been described in conjunction with the examples outlined above, various alternatives, modifications, variations, and/or improvements of those features and/or examples may be possible. Accordingly, the examples, as set forth above, are intended to be illustrative. Various changes may be made without departing from the broad spirit and scope of the underlying principles.

What is claimed is:

1. A driving support device comprising:
   a vehicle position information acquisition unit that acquires information indicating the position of the vehicle;
   a registered position information acquisition unit that acquires information indicating a registered position that has been previously registered;
   a charging facility information acquisition unit that acquires information indicating a position and a charging capacity of a charging facility that exists within a predetermined distance from a position of a vehicle;
   a remaining electric power amount inform acquisition unit that acquires information indicating the remaining electric power amount of a battery installed in the vehicle, at the position of the vehicle; and
   a guidance unit that shows, by using arrows, a route if the vehicle travels directly from the position of the vehicle to the registered position located in the rear of the vehicle and a route if the vehicle travels beyond an intersection ahead of the vehicle from the position of the vehicle and arrives at the registered position located in the rear of the vehicle by way of the charging facility; and provides, beside each arrow, information indicating a charging time period at the charging facility based on the position of the vehicle, the registered position, the position and the charging capacity of the charging facility, and the remaining electric power amount of the battery, the charging time period being required for traveling the route indicated by the arrow with electric power of the battery, the information being indicated on states in which the charging time period is zero, more than zero but less than or equal to a predetermined time period, and more than the predetermined time period, as different stages.

2. The driving support device according to claim 1, wherein the guidance unit determines the charging time period for each of a plurality of routes and provides information on the each of the plurality of the routes being associated with the charging time period.

3. The driving support device according to claim 1, wherein the route from the position of the vehicle to the registered position includes a route going through the charging facility that exists in an opposite direction of the registered position with respect to the position of the vehicle.

4. The driving support device according to claim 1, wherein the guidance unit acquires total electric power amount necessary for traveling the route from the position of the vehicle to the registered position based on a distance of the route and consumption electric power amount per a unit of distance of the battery, acquires necessary electric power amount to charge the battery based on the total electric power amount and the remaining electric power amount of the battery, and acquires the charging time period to be required for charging the battery for the necessary electric power amount based on the charging capacity.

5. A driving support method, the method comprising:
acquiring information indicating the position of the vehicle;
acquiring information indicating a registered position that has been previously registered;
acquiring information indicating a position and a charging capacity of a charging facility that exists within a predetermined distance from a position of a vehicle;
acquiring information indicating a remaining electric power amount of a battery at the position of the vehicle, the battery being installed in the vehicle;
displaying arrows that show, a route if the vehicle travels directly from the position of the vehicle to the registered position located in the rear of the vehicle and a route if the vehicle travels beyond an intersection ahead of the vehicle from the position of the vehicle and arrives at the registered position located in the rear of the vehicle by way of the charging facility; and
providing, beside each arrow, information indicating a charging time period at the charging facility based on the position of the vehicle, the registered position, the position and the charging capacity of the charging facility, and the remaining electric power amount of the battery, the charging time period being required for traveling a route from the position of the vehicle to the registered position by electric power of the battery.

6. A driving support program stored in a tangible computer readable medium and configured to cause a computer to execute the functions of:
acquiring information indicating the position of the vehicle;
acquiring information indicating a registered position that has been previously registered;
acquiring information indicating a position and a charging capacity of a charging facility that exists within a predetermined distance from a position of a vehicle;
acquiring information indicating a remaining electric power amount of a battery at the position of the vehicle, the battery being installed in the vehicle;
displaying arrows that show, a route if the vehicle travels directly from the position of the vehicle to the registered position located in the rear of the vehicle and a route if the vehicle travels beyond an intersection ahead of the vehicle from the position of the vehicle and arrives at the registered position located in the rear of the vehicle by way of the charging facility; and
providing, beside each arrow, information indicating a charging time period at the charging facility based on the position of the vehicle, the registered position, the position and the charging capacity of the charging facility, and the remaining electric power amount of the battery, the charging time period being required for traveling a route from the position of the vehicle to the registered position by electric power of the battery.

* * * * *